United States Patent
van Blokland

(10) Patent No.: US 9,521,852 B2
(45) Date of Patent: Dec. 20, 2016

(54) DEVICE FOR WEIGHING DOUGH

(71) Applicant: Radie B.V., Culemborg (NL)

(72) Inventor: Johannes Josephus Antonius van Blokland, Beusichem (NL)

(73) Assignee: Radie B.V., Culemborg (NL)

( * ) Notice: Subject to any disclaimer, the term of this patent is extended or adjusted under 35 U.S.C. 154(b) by 0 days.

(21) Appl. No.: 13/956,909

(22) Filed: Aug. 1, 2013

(65) Prior Publication Data
US 2014/0034448 A1 Feb. 6, 2014

(30) Foreign Application Priority Data
Aug. 2, 2012 (EP) ..................................... 12179101

(51) Int. Cl.
G01G 11/04 (2006.01)
B65G 13/00 (2006.01)
G01G 13/02 (2006.01)
A21C 5/00 (2006.01)

(52) U.S. Cl.
CPC ................. *A21C 5/00* (2013.01); *G01G 11/04* (2013.01)

(58) Field of Classification Search
None
See application file for complete search history.

(56) References Cited

U.S. PATENT DOCUMENTS

| | | | | |
|---|---|---|---|---|
| 3,722,747 A * | 3/1973 | Petit | ....................... | B65D 88/28 222/198 |
| 4,580,475 A * | 4/1986 | Antonissen | ............... | B26D 5/20 83/278 |
| 5,158,792 A * | 10/1992 | Morikawa | ................. | A21O 5/00 426/231 |
| 5,188,210 A * | 2/1993 | Malow | ................ | B65G 21/2054 198/369.5 |
| 6,272,979 B1 * | 8/2001 | Morikawa | ................. | A21C 3/10 425/321 |
| 6,367,618 B1 * | 4/2002 | Szuba | ................... | B65G 47/263 198/781.01 |
| 6,524,090 B1 * | 2/2003 | Hayashi | .................... | A21C 3/02 425/140 |
| 8,829,366 B2 * | 9/2014 | Yuan | ....................... | G01G 11/04 177/145 |
| 2006/0278094 A1 * | 12/2006 | Rauch | ....................... | A21C 3/04 99/348 |

FOREIGN PATENT DOCUMENTS

EP 2116821 A1 11/2009
GB 2391323 A 2/2004

* cited by examiner

*Primary Examiner* — Kavel Singh
(74) *Attorney, Agent, or Firm* — The Webb Law Firm

(57) ABSTRACT

The present invention relates to a device for weighing dough, comprising an endless conveyor, for conveying a plurality of endless dough pieces, extending essentially in parallel lanes on said conveyor in a direction of conveyance and a plurality of weighing-units, arranged under the endless conveyor, and supporting the latter, the weighing units being distributed at different locations spread over the width of the conveyor, each for weighing a different dough piece.

13 Claims, 4 Drawing Sheets

DEVICE FOR WEIGHING DOUGH

CROSS-REFERENCE TO RELATED APPLICATIONS

This application claims priority under 35 U.S.C. 119(a)-(d) to European Patent Application No. 12179101.6 filed on Aug. 2, 2012 in the European Intellectual Property Office, the disclosure of which is hereby incorporated by reference in its entirety.

BACKGROUND OF THE INVENTION

1. Field of the Invention

The present invention relates to an apparatus for weighing dough. More in particular, the invention relates to a device for conveying a plurality of endless dough pieces, extending essentially in parallel lanes on said conveyor in a direction of conveyance.

2. Description of Related Art

Such devices are known in the art, for example from the European Patent EP 2 116 821 in the name of the same applicant. The device disclosed therein has proved to be an improvement over the prior art, but a demand for further development has appeared.

In particular, when applied in circumstances wherein a plurality of continuous dough pieces is processed that appear not to have equal average weight distributions, it is considered disadvantageous that an average of multiple dough pieces is weighed, in order to determine a common cutting length for all pieces, based on a desired weight per piece.

One solution may be to split up the single conveyor into a plurality of small conveyors, one for each (endless) dough piece, but this has several disadvantages. The construction is complex, and since there is a space in between the separate conveyors, there is a higher risk of filthiness such as dough and flour residue occurring in between the conveyors, which leads to more maintenance and possible negative influence on the weighing performance.

A device for conveying and weighing dough pieces is also known from GB 2 391 323. GB 2 391 323 discloses a weighing conveyor assembly which separately weighs a parallel portion of a stream of separate food items.

It is a goal of the present invention, to provide a solution that does not have the above disadvantages, or at least to provide a useful alternative to the state of the art.

SUMMARY OF THE INVENTION

The invention thereto proposes a device for weighing dough, comprising an endless conveyor, for conveying a plurality of endless dough pieces, extending essentially in parallel lanes on said conveyor in a direction of conveyance, and a plurality of weighing-units, arranged under the endless conveyor, and supporting the latter, the weighing units being distributed at different locations spread over the width of the conveyor, each for weighing a different dough piece.

Despite of prejudices regarding the attainability of this solution, in particular alleged risk of interference between weight measurements of parallel dough pieces, it has appeared that the device according to the present invention gives surprisingly good results and accuracy. For that purpose a relatively thin conveyor belt is used.

Preferably, the weighing units comprise weighing rollers, instead of weighing tables. Rollers have a smaller contact area with the dough, and can therefor be used in combination with the thin conveyor belt. The rollers may be driven not to brake the conveyor, and to cause minimal friction. Rollers are further preferred for measuring continuous dough pieces, because the small contact area is the most suitable for taking samples of the measured weight every predetermined amount of transposition of the conveyor, which may for instance be every 0.1 or 0.25 or 0.5 mm. These measured weights are added up, and once a desired cumulative weight is reached, a cutter is activated.

In an embodiment the weighing rollers are arranged coaxially. That is, in their non-charged position, they extend in line. This leads to a compact and relatively simple construction. It is preferred that the sum of the individual widths of the weighing rollers equals at least the width of the conveyor, or at least the width on which dough pieces are to be conveyed. In case rollers are to be used that do not sum to this total width, dummy rollers without weighing facilities, may be applied in between the actual ones. For enabling a change of the number or weight of parallel dough pieces that can be weighed at a time, an exchangeable part such as a cartridge may comprise the weighing units.

For ruling out, or at least avoiding influence of the tension of the conveyor on the measurement, the conveyor is arranged slackly in a width direction. Thereto, it may be provided with one or more transition parts, arranged slightly inward of the outer edges of the conveyor in the width direction, and wherein the transition parts are arranged to provide the middle part in between the transition part with a substantially flexible suspension in a direction perpendicular to a plane defined by the width direction and the direction of conveyance.

In a preferred embodiment, the outer edges of the conveyor comprise a toothed belt, and wherein the device comprises gear drive for driving the conveyor. A drive configuration with a toothed belt is free of slip, and allows to determine and to keep track of the exact position of the belt. The conveyor may preferably be driven at both sides, and may further comprise a line, extending over the with of the conveyor perpendicular to the direction of conveyance, for verifying a correct placement of the conveyor with respect to the gear drive.

To reduce the distance over which the conveyor is hanging loose in the direction of conveyance, each weighing unit may be preceded and/or succeeded by a support roller underneath the conveyor. In case of two support rollers, they are at a mutual distance preferably lower than 250 mm, and preferably lower than 100 mm.

The device as described above may further be equipped with a plurality of cutting units downstream the weighing units, for cutting each of the parallel dough pieces, and an aligning section arranged downstream the plurality of cutting units, which may comprise two or more subsequent aligning units. Aligning units being small or short conveyors with a length of a cut dough piece, for collecting such dough piece, stopping it, and releasing multiple dough pieces once they are lined up parallel, i.e. once all aligning units are filled.

The device may further comprise a controller for controlling the cutting and aligning units based on signals received from the weighing units, which controller for instance samples the value measured by each weighing unit after a predetermined displacement of the conveyor, for controlling the cutting units based thereon.

BRIEF DESCRIPTION OF THE DRAWINGS

The invention will now be elucidated into more detail with reference to the following figures, in which.

DESCRIPTION OF THE INVENTION

Figure 1:
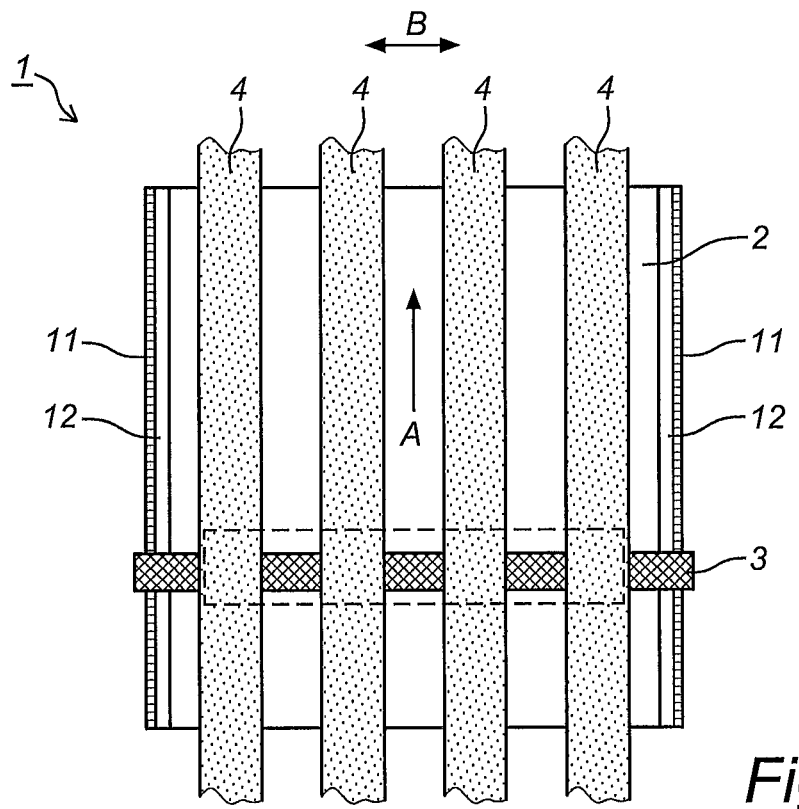
FIG. 1 shows schematically a weighing device according to the state of the art.

FIG. 1 shows a weighing device 1 according to the state of the art. An endless conveyor 2 conveys multiple endless dough pieces 4 in the direction of arrow A. Under the conveyor 2, a common weighing unit 3 for all dough pieces 4 is arranged.

Figure 2:
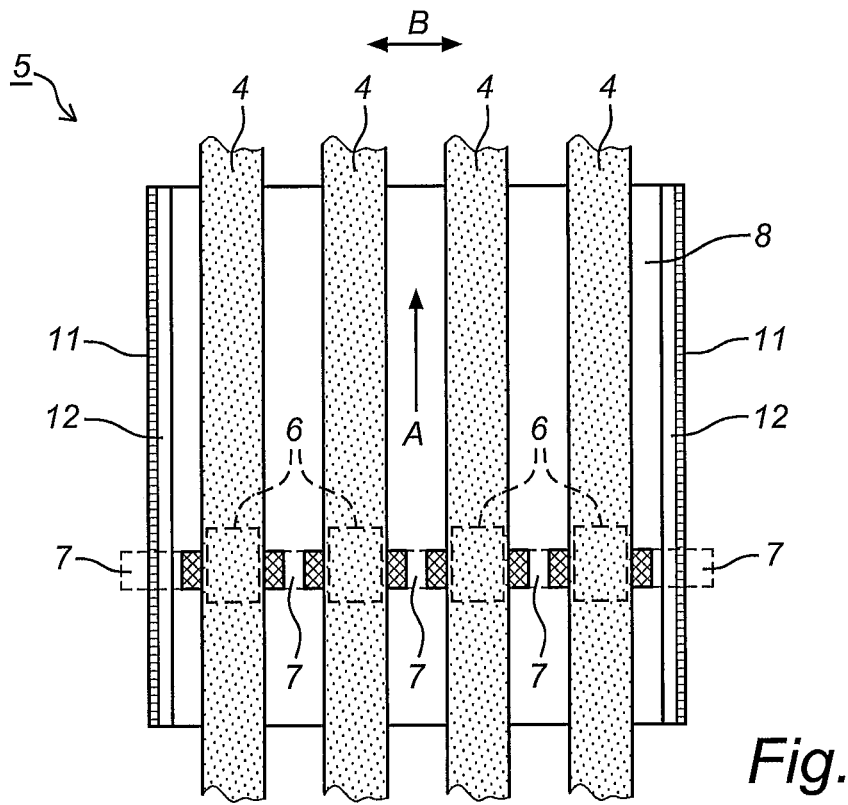
FIG. 2 shows schematically a weighing device according to the invention.

FIG. 2 shows schematically a weighing device 5 according to the invention. An endless conveyor 8 conveys multiple endless dough pieces 4 in the direction of arrow A. Under the conveyor 8, multiple (in this case four) weighing units 6, each for weighing a different dough piece 4.

Figure 3:
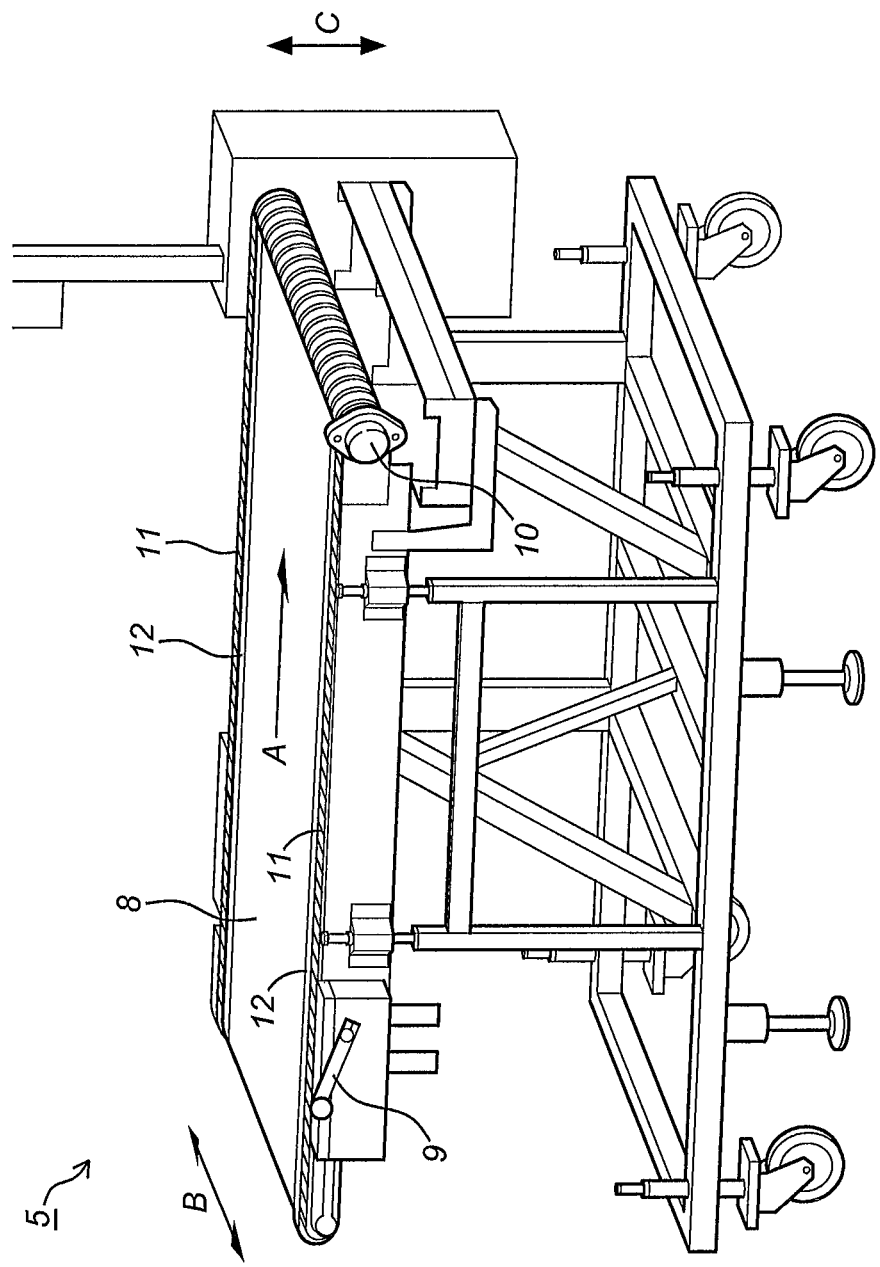
FIG. 3 shows a perspective view of a weighing device according to the invention.

FIG. 3 shows a perspective view of the device 5 from FIG. 2. The figure further shows that the device according to the invention may be displaceable, and a lever 9 for stretching or tensioning the conveyor in the direction of conveyance. In practice, it appears that about 1% stretch gives good results. The conveyor comprises toothed belts 11 at its sides, which cooperates with drive 10, and has transition parts 12 to provide the middle part in between the transition parts 12 with a substantially flexible suspension in a direction C, perpendicular to a plane defined by the width direction B and the direction of conveyance A.

Figure 4:
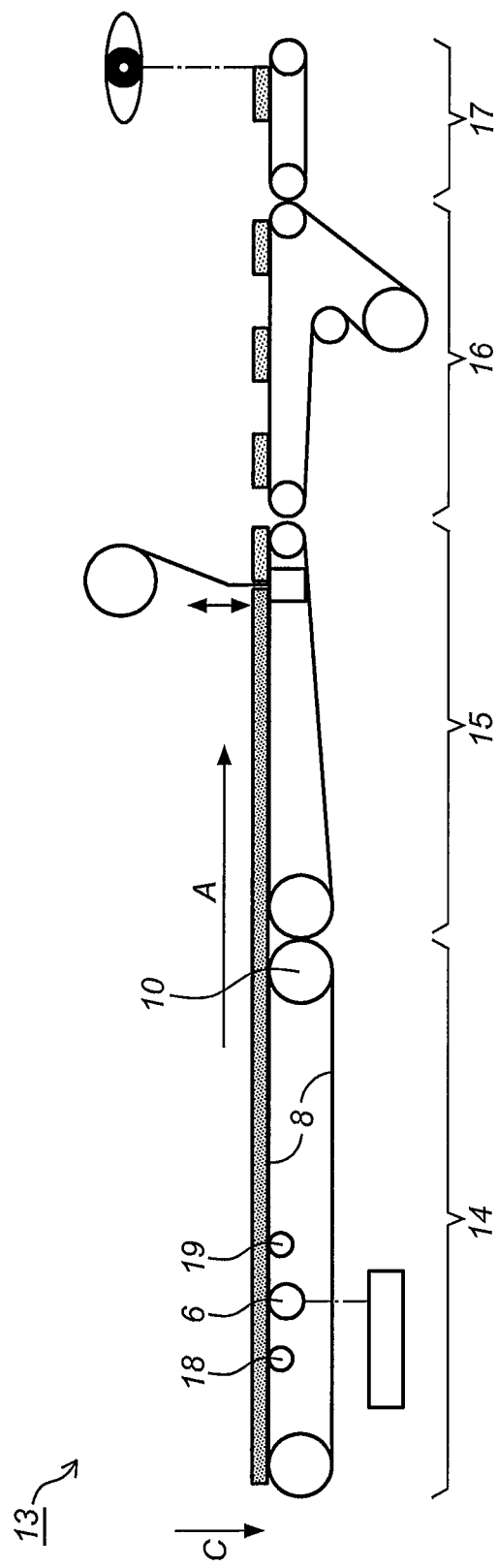
FIG. 4 shows a complete weighing and cutting line according to the invention.

FIG. 4 shows a schematic representation of a complete weighing and cutting line 13 according to the invention. The line 13 comprises a weighing section 14, a cutting section 15, a separating section 16 and a outlining section 17.

Figure 5:
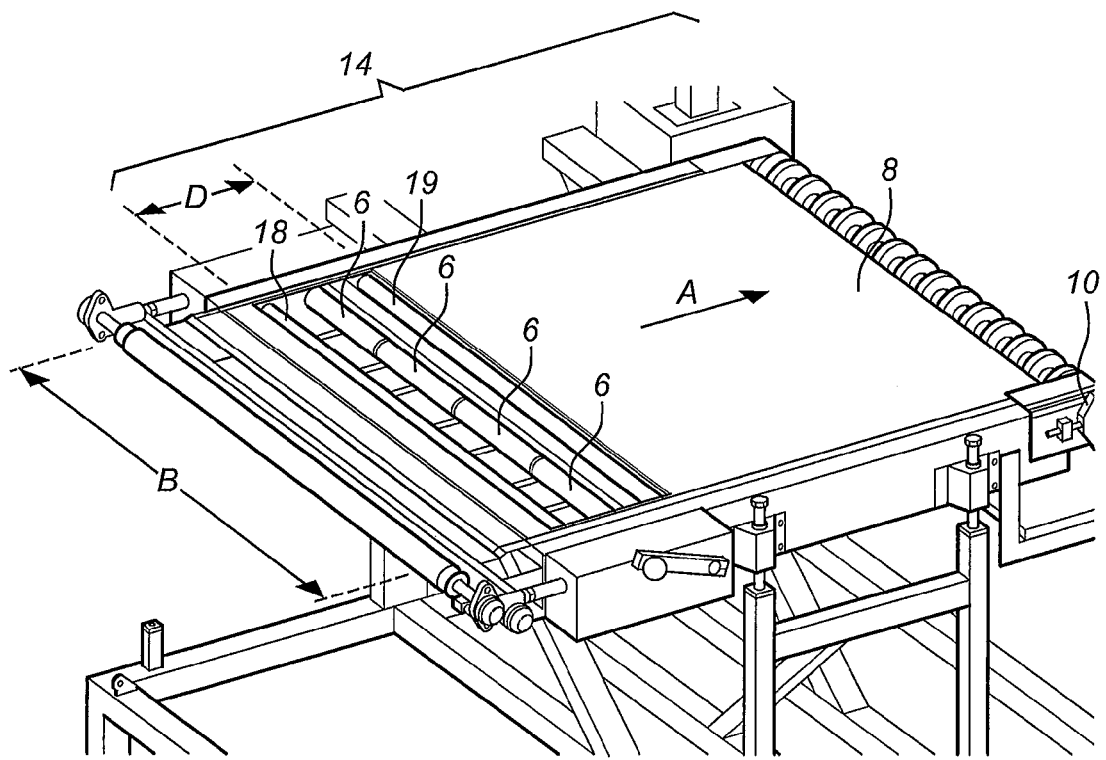
FIG. 5 shows a partially transparent view of the invention.

FIG. 5 shows a partially transparent view of the invention. Visible are the conveyor 8 in weighing section 14, as well as weighing units 6, with preceding and succeeding support rollers 18, 19.

Figure 6:
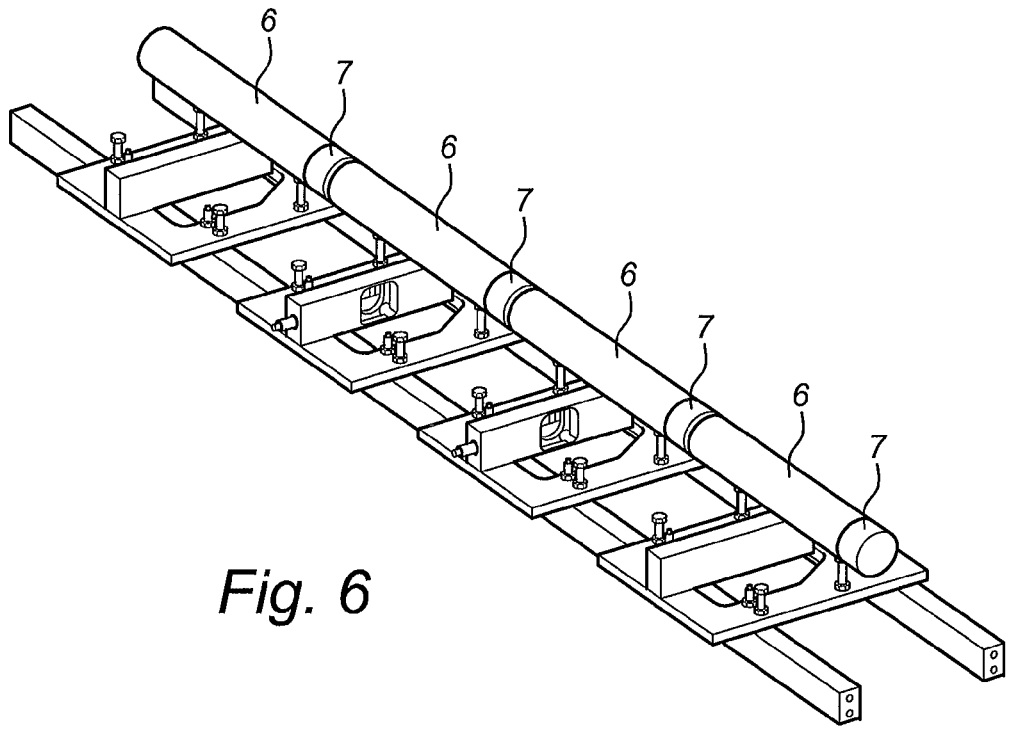
FIG. 6 show a detail of the weighing units applied in the present invention.

FIG. 6 show a detail of the weighing units applied in the present invention, with optional dummy rollers 7, which can be applied when the total of the rollers is less than the width of the conveyer over which dough pieces are (expected to be) transported. The upper level of the actual weighing rollers and the dummy rollers is preferably equal, and at level of the conveyor.

The above embodiments are exemplary and do not limit the scope of the invention as defined in the following claims.

The invention claimed is:

1. A device for weighing dough, comprising:
   an endless conveyor, for conveying a plurality of endless dough pieces, extending essentially in parallel lanes on the endless conveyor in a direction of conveyance;
   a plurality of weighing rollers, arranged under the endless conveyor, and supporting the latter, the weighing rollers being distributed at different locations spread over the width of the conveyor in a direction perpendicular to the direction of conveyance, each for weighing a different dough piece positioned along the direction perpendicular to the direction of conveyance,
   wherein the device comprises a plurality of cutting units downstream the weighing rollers, for cutting each of the parallel dough pieces, and
   wherein the weighing rollers are configured to measure a weight of each dough piece.

2. The device according to claim 1, wherein the weighing rollers are arranged coaxially.

3. The device according to claim 1, wherein the sum of the individual widths of the weighing rollers equals at least the width of the conveyor.

4. The device according to claim 1, wherein the conveyor is arranged slackly in a width direction.

5. The device according to claim 4, wherein the conveyor is provided with one or more transition parts, arranged slightly inward of the outer edges of the conveyor in the width direction, and wherein the transition parts are arranged to provide the middle part in between the transition part with a substantially flexible suspension in a direction perpendicular to a plane defined by the width direction and the direction of conveyance.

6. The device according to claim 5, wherein the outer edges of the conveyor comprise a toothed belt, and wherein the device comprises gear drive for driving the conveyor.

7. The device according to claim 6, wherein the conveyor comprises a line, extending over the width of the conveyor perpendicular to the direction of conveyance, for verifying a correct placement of the conveyor with respect to the gear drive.

8. The device according to claim 1, wherein each weighing rollers is preceded and/or succeeded by a support roller underneath the conveyor.

9. The device according to claim 8, wherein the support rollers are at a mutual distance lower than 250 mm, and preferably lower than 100 mm.

10. The device according to claim 1, comprising a separator unit and/or an aligning section arranged downstream the plurality of cutting units.

11. The device according to claim 10, wherein the aligning unit comprises two or more subsequent aligning units.

12. The device according to claim 1, comprising a controller for controlling the cutting and aligning units based on signals received from the weighing rollers.

13. The device according to claim 12, wherein the controller samples the value measured by each weighing rollers after a predetermined displacement of the conveyor, for controlling the cutting units based thereon.

* * * * *